May 26, 1925. 1,539,078

F. T. DE LONG

THIRD AND FOURTH POINT SUPPORT FOR BRAKE BEAMS

Filed April 13, 1922

Inventor.
FREDERIC T. DE LONG.

By
Attorney.

Patented May 26, 1925.

1,539,078

UNITED STATES PATENT OFFICE.

FREDERIC T. DE LONG, OF CHICAGO, ILLINOIS, ASSIGNOR TO CHICAGO RAILWAY EQUIPMENT COMPANY, OF CHICAGO, ILLINOIS, A CORPORATION OF ILLINOIS.

THIRD AND FOURTH POINT SUPPORT FOR BRAKE BEAMS.

Application filed April 13, 1922. Serial No. 552,266.

*To all whom it may concern:*

Be it known that I, FREDERIC T. DE LONG, a citizen of the United States, residing at the city of Chicago, county of Cook, and State of Illinois, have invented a certain new and useful Improvement in Third and Fourth Point Supports for Brake Beams, of which the following is a full, clear, and exact description, such as will enable others skilled in the art to which it appertains to make and use the same, reference being had to the accompanying drawings, forming part of this application, in which—

This invention relates to a new and useful improvement in third and fourth point supports for brake beams, the object being to construct a flexible brake beam support having varying flexibility from its extremity to its point of attachment to a part of the car truck whereby should the brake beam fall, said brake beam would be supported by the relatively stiff or less flexible portion of the support.

Figure 1:
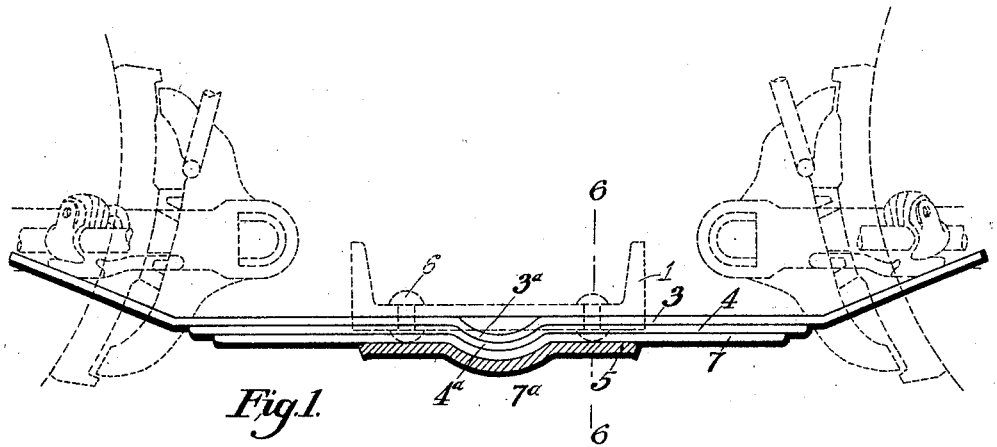
Figure 1 is an elevational view partly in section of my improved third and fourth point supports for brake beams.
Figure 2:
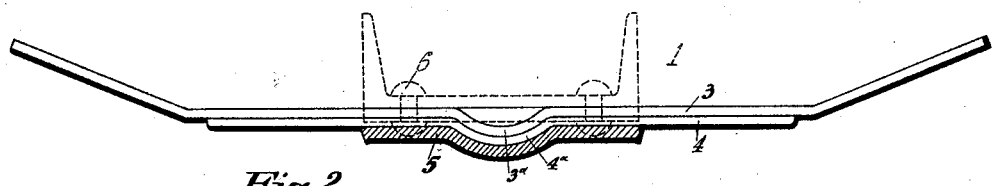
Figure 2 is a similar view of a slightly modified form.
Figure 3:
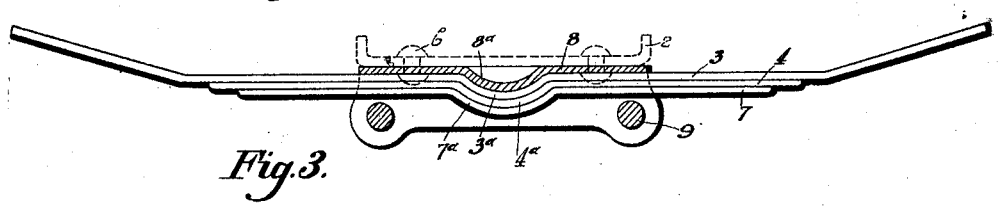
Figures 3 and 4 are similar views of other modified forms.
Figure 4:
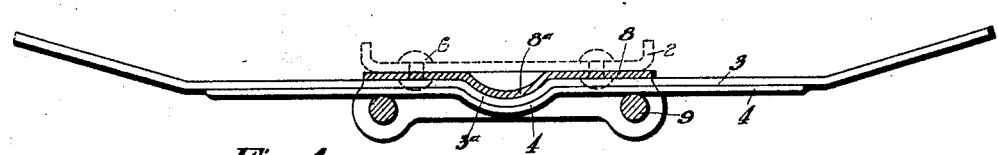

In the drawings, 1 indicates the spring plank of a car truck illustrated as a channel in Figures 1 and 2, and as a pressed member 2 in Figures 3 and 4.

3 indicates the flexible track member or support which is preferably formed with a jog or bend 3$^a$ at about the middle portion.

4 indicates a reinforcing leaf formed with a similar jog or bend 4$^a$ in its middle portion, in which is nested the jog or bend of the first mentioned main leaf or support.

5 indicates a securing bracket secured in position to the spring plank by means of rivets 6, this bracket being provided with a seat for the bent portion of leaf 4, whereby when the main leaf or support 3 and its reinforcing leaf or support 4 are in position, they are held against longitudinal movement.

The third leaf or support, indicated at 7 in Figure 1, may be used as an additional reinforcement, it having a jog or bend by which it is nested and prevented from longitudinal movement. This third leaf 7 is preferably slightly shorter than its superposed leaf 4.

In Figures 3 and 4, I have shown single and double reinforcing leaves, but this form of leaves bear up under a bracket 8 having a protuberance 8$^a$ whereby the jogs or bends referred to, fitting over said protuberance, are prevented from longitudinal movement, the main leaf or support and its underlying reinforcing leaves being held in position by bolts or rods 9 passing through depending lugs at the ends of the bracket 8.

My present invention is designed as an improvement upon the construction illustrated in U. S. Patent No. 1,278,608, dated September 10, 1918, granted upon my application, and is intended to provide a support for the brake beam which, while sufficiently flexible to yield slightly, is yet strong enough to support the beam in the event of displacement or breakage of the brake hanger.

By adding one or more reinforcing leaves, and utilizing the main leaf of the spring-like construction illustrated, I am enabled to greatly increase the stiffness of the support towards the spring plank to which it is connected, and consequently am enabled to make it sufficiently strong at or near the spring plank to support the weight of the brake beam should it fall thereon.

Figure 5:
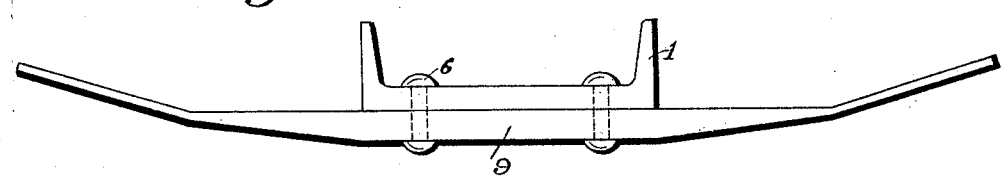
Figure 5 is a similar view of another modified form.
Figure 6:
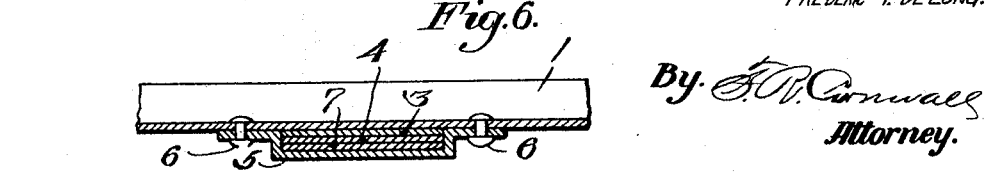
Figure 6 is a transverse cross section taken on line 6—6 of Figure 1 and showing the spring in cross section.

In Figure 5, I have shown a modified form of my invention in which there is a single supporting member 9 fixed at its middle and tapering towards each end, whereby varying flexibility is provided from the thinner extremities to the point of attachment to the spring plank.

What I claim is:

1. In a car construction, the combination with a trussed brake beam a truck part, a safety support for brake beams attached to said truck part and having a rigid portion disposed under the brake beam compression member, and a yielding track portion extending under the brake beam tension member.

2. In a car construction, the combination with a trussed brake beam of a truck part, a safety support for brake beams secured to said truck part and underlying said brake beam, said safety support comprising a rigid portion adapted to support the brake beam compression member of said brake beam, and a flexible track portion adapted to form a yielding support for the brake beam tension member of said beam.

3. In a car construction, the combination with a brake beam of a truck part, a safety support for brake beams attached to said truck part and underlying said brake beam, said safety support comprising a main leaf constituting a flexible supporting element for the tension member of the beam, and a reinforcing leaf in juxtaposed relation with the inner portion of the first leaf forming a rigid support for the compression member of said beam.

4. In a brake gear construction, the combination with a brake beam, of a support underlying said brake beam, said support being of varying flexibility from its point of attachment to its extremity, thereby forming a yielding third or fourth point support for said brake beam and a rigid support adapted to catch or safely support said brake beam in case of displacement thereof.

5. In a car construction, the combination with a trussed brake beam of a truck part, a safety support for trussed brake beams secured to said truck part and comprising a plurality of nested flexible leaves of different lengths arranged to provide a yielding support for the tension member of said beam, and a rigid support for the compression member of said beam.

6. In a car construction, the combination of a brake beam, a safety support therefor, said support being adapted to be secured to a part of a truck and comprising a flexible member for yieldingly supporting the tension member of said brake beam, and a reinforcing member for reinforcing the inner portion of said flexible member to provide a rigid support for supporting the compression member of said beam.

7. In a car construction, the combination with a trussed brake beam, of a safety support therefor, said support comprising a main leaf in yielding supporting engagement with the tension member of said brake beam and an auxiliary leaf nested with the first leaf and held against longitudinal movement relative thereto, said auxiliary leaf being adapted to reinforce the inner portion of said main leaf to provide a rigid support for the compression member of the brake beam in case said brake beam is displaced.

8. In a car construction, the combination with a trussed brake beam of part of a truck, a brake beam safety support of varying flexibility comprising a main leaf having a jog in its length, a reinforcing leaf having a jog in its length and designed to be nested with respect to the first-mentioned jog, and means for securing said support and its reinforcing member to said truck part.

In testimony whereof I hereunto affix my signature this 7th day of April, 1922.

FREDERIC T. DE LONG.